United States Patent [19]
Van Domelen et al.

[11] Patent Number: 5,866,048
[45] Date of Patent: Feb. 2, 1999

[54] METHOD FOR PRODUCING A SET OF OPTICAL DEVICES

[75] Inventors: Joseph David Van Domelen; Mark A. Thomas, both of Hillsboro, Oreg.

[73] Assignee: Leupold & Stevens, Inc., Beaverton, Oreg.

[21] Appl. No.: 640,190

[22] Filed: Apr. 30, 1996

[51] Int. Cl.$^6$ ....................................................... B29D 11/00
[52] U.S. Cl. ............................ 264/2.5; 264/40.1; 359/407
[58] Field of Search ..................................... 264/2.5, 40.1; 425/135, 140; 29/20; 359/407

[56] References Cited

U.S. PATENT DOCUMENTS 3,614,211 10/1971 Letter .
4,278,339 7/1981 Uchida et al. .
4,502,763 3/1985 Shimizu .
4,568,155 2/1986 Shimizu .
4,626,081 12/1986 Nishizawa .

Primary Examiner—Mathieu D. Vargot
Attorney, Agent, or Firm—Stoel Rives LLP

[57] ABSTRACT

A method for producing a group of binoculars entails the use of injection molding to mold prism set housings with great uniformity. Prior to any production run, the mold is refined by iteratively producing and testing a prism set housing, altering the mold, and then molding another test prism set housing. This method is less time-consuming and less expensive than methods available until now. Moreover, it permits the production of binocular channels that are more thoroughly waterproof than previously available because no aperture in the binocular channel is necessary for the adjustment of individual prism set housings.

11 Claims, 5 Drawing Sheets

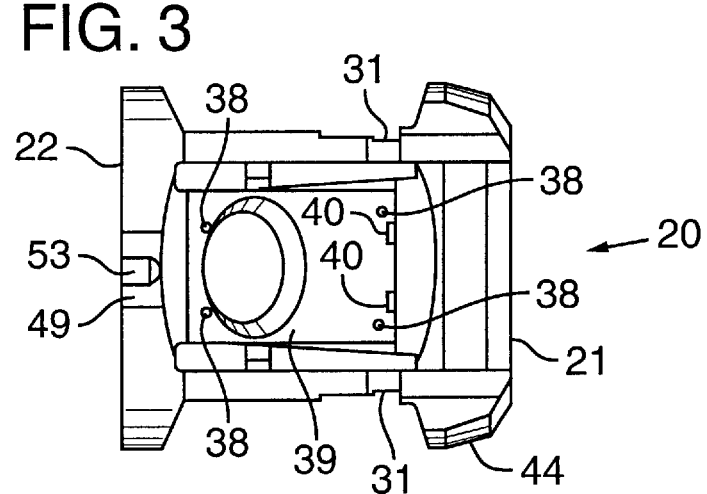
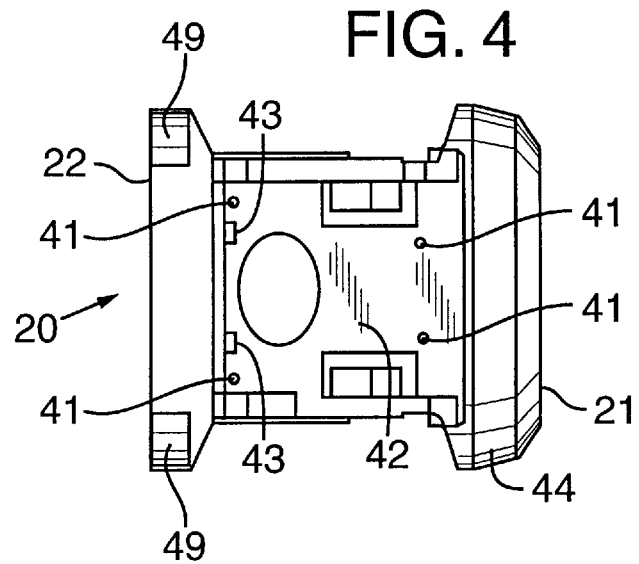

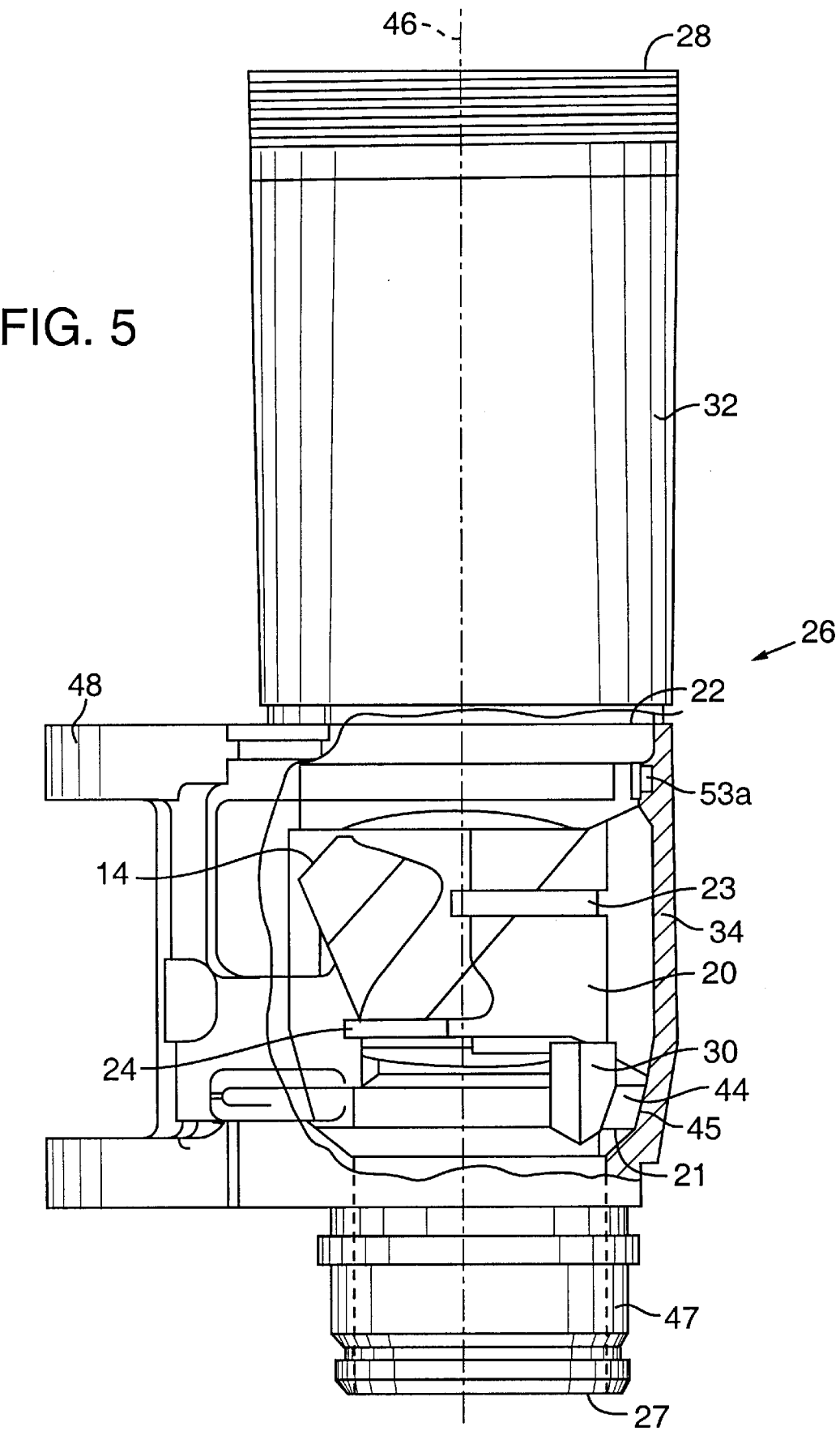

METHOD FOR PRODUCING A SET OF OPTICAL DEVICES

TECHNICAL FIELD

The present invention is generally related to methods for producing an optical device employing a prism set, such as a pair of binoculars or a spotting scope. More specifically, it is related to a method for permitting the accurate seating of a prism set within each optical channel of an optical device, whereby each device is produced less expensively than was heretofore possible and may be made more thoroughly watertight.

BACKGROUND OF THE INVENTION

Each optical device produced generally has a set of prisms in each channel to reorient the otherwise upside-down image. The precision required in the placement and orientation of these prism sets has presented a problem. There is no manufacturing technology which can easily produce a prism set housing that conforms accurately enough to a detailed shape specification to satisfy the required accuracy of prism set orientation within the optical channel.

The accuracy of one candidate prism set housing production method, injection molding, is limited principally by two factors. The first factor is the machining of the mold. There is a limit, at the level of about 12 μm (0.5 mil), to the accuracy of machining an article. The second factor is the shrinkage of the molded material. The resins commonly used for injection molding tend to shrink while cooling down from the injection temperature. The temperature and pressure at which the molding takes place affects the amount of shrinkage. Unfortunately, the more complex the molded shape the more difficult it is to predict the amount of shrinkage across a specified cut of the molded piece.

Because of the difficulty of precisely manufacturing a prism set housing to a specification, it is typical for the prism set to be held in place by an adjustable housing. This housing is secured into an optical device channel that is equipped with an aperture through which a technician may insert tools to adjust the orientation of the prisms. The prism set housing is adjusted until the prisms are oriented to within the required accuracy.

There are two problems with this type of procedure. The first problem is that it is time consuming and expensive to adjust the prism set orientation in each channel of every optical device produced. The second problem is that the aperture for tool insertion reduces the integrity of the optical channel. This is true even when efforts have been made to carefully reseal the tool insertion aperture. The reduction in optical channel integrity reduces the degree to which the device can be made watertight.

SUMMARY OF THE INVENTION

It is, therefore, an object of the present invention to provide a method for producing a multiplicity of high performance optical devices (such as binoculars) which method does not require a critical prism set housing adjustment for every binocular channel produced.

The method begins with the formation of a mold for the production of prism set housing units and the molding of at least one such unit. The mold should originally be machined so that its part-forming cavity is selectively slightly smaller than the specified part size. This is so because it is practicable only to increase the size of a mold cavity.

The prism set housing produced is tested with a prism set to determine whether the housing can hold the prism set at the correct orientation to within a specified error limit. If the prism set housing holds the prism set at an orientation that is outside of the specified error limit, a recommended modification of the mold shape is generated and given to the mold maker who selectively enlarges the mold in conformance with the modification. Again, this enlargement is generally performed in a conservative manner, because it is not practicable to decrease the mold cavity size. Alternatively, it may be determined that a change in the molding temperature or pressure or both is required.

The above steps may be iterated several times until the prism set housing is found to hold the prisms at an orientation that meets the specified error limit. After a mold of the specified size has been formed, a large number of housings are produced, all under the same temperature and pressure as were used for the housing that was found to be within tolerance of the shape specification. Injection molding, repeated under identical conditions, such as in this case, provides a highly uniform result. The mold remains virtually unaltered through this process because the resins injected into it are in liquid form and do not significantly abrade the mold. The result of this process is that the optical device producer is provided with a potentially large number of prism set housings with a uniformly accurate shape. The other components are also manufactured to fairly tight tolerances so that each channel may be produced without the necessity of internal adjustments. Each optical device channel is machined to mate with the prism set housing so that the orientation of the prism set housing with respect to the binocular channel is deterministic with only minimal errors.

Because errors are impossible to eliminate, however, it is necessary, in the case of binoculars, to adjust the alignment of the channels when they are hinged together. Toward this end, eccentric bearings are provided at the hinge so that when each pair of binoculars is produced, the alignment of the two channels may be adjusted adequately to compensate for divergent errors in the optical trains of the two channels. Because the errors may be kept quite small, this adjustment to the alignment need not be so great that it would be noticed in a simple visual inspection of the binoculars. Likewise, when the binoculars are in use and the distance separating the channels is adjusted by actuating the hinge, the change in the alignment of the channels caused by this action will be negligible.

Additional objects and advantages of this invention will be apparent from the following detailed description of a preferred embodiment thereof which proceeds with reference to the accompanying drawings.

BRIEF DESCRIPTION OF THE DRAWINGS

FIG. 3 is a top view of the prism set housing of FIG. 2;

FIG. 4 is a bottom view of the prism set housing of FIG. 2;

FIG. 5 is a top cut-away view of a binocular channel that may be produced in conjunction with the present invention;

DETAILED DESCRIPTION OF A PREFERRED EMBODIMENT

Figure 1:
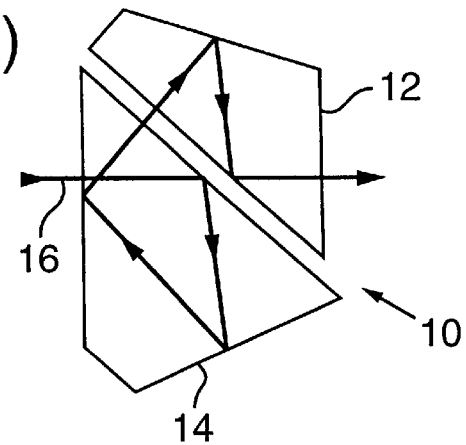
FIG. 1 is a side view of a prior art prism set showing the path of light travel through the set.

FIG. 1 shows an enlarged sideways cross-sectional view of a prior art set of prisms 10 including a roof prism 12 and a delta prism 14. A single light ray 16 is shown travelling through this prism set. Light ray 16 is reflected three times in delta prism 14 and three times in roof prism 12 (one reflection cannot be shown in roof prism 12 because the reflection is perpendicular to the plane of the drawing). Even a very small error in the orientation of roof prism 12 with respect to delta prism 14 will cause blurring in the image because the error is multiplied through the numerous reflections.

Only slightly less onerous is the requirement for precision in the location and orientation of prism set 10 with respect to the rest of the optical train in the channel. Until now, in order to meet these requirements, it was typical to critically adjust each prism set after it was installed into an optical device channel or body. This method was expensive and time consuming. Because it was necessary to include an aperture in the body of the binoculars in order for the adjustments to be made, this method reduced the integrity of the binocular bodies.

Figure 2:
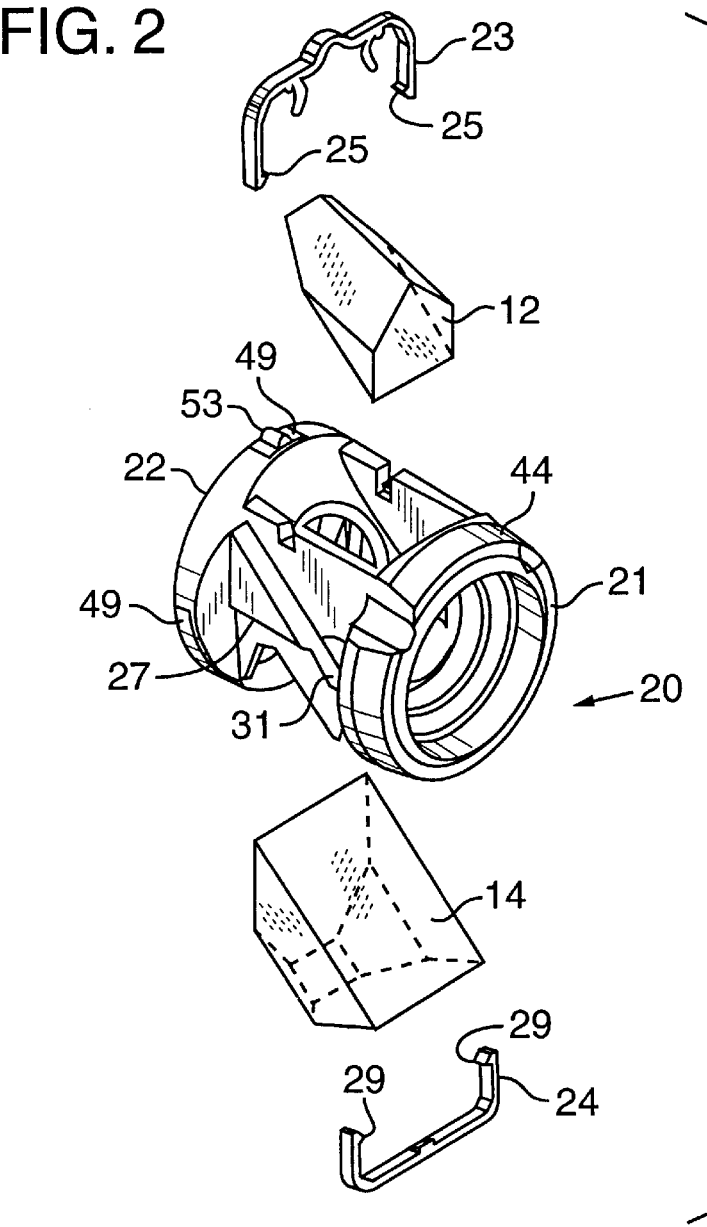
FIG. 2 is an exploded isometric view of a prism set and a prism set housing in accordance with the present invention.

A prism set housing 20 constructed in accordance with the present invention is shown in FIGS. 2, 3, 4, and 5. Housing 20 has a proximal end 21 and a distal end 22. FIG. 2 also shows roof prism 12, delta prism 14, a roof prism clip 23, and a delta prism clip 24. A pair of roof prism clip teeth 25 engage with a pair of first receptive ledges 27. Likewise a pair of delta prism clip teeth 29 engage with a pair of second receptive ledges 31. FIG. 5 also shows specifically a binocular channel 26 with a proximal end 27 and a distal end 28. The invention could be implemented for any optical device channel bearing a set of prisms. Prior to installation in binocular channel 26, prisms 12 and 14 are fit into housing 20 and held in place by clips 23 and 24.

For the optimal implementation of the method of the present invention, it is necessary for the entire binocular channel 26 to be accurately produced. One method of achieving this objective that has been explored by the inventors is to machine binocular channel 26 from a single extruded aluminum or magnesium workpiece. Alternatively, an objective extension 32 for holding the distal portion of the optical train may be machined from a first workpiece, and a mating binocular body 34 for holding the proximal portion of the optical train including prism set housing 20 may be machined from a second workpiece. Extension 32 and body 34 are eventually accurately glued and screwed together to form a complete channel 26.

A set of four raised roof prism support pads 38 on a roof prism seat 39 (FIG. 3) and a pair of vertical roof prism stops 40 (FIG. 3) on the most proximal portion of roof prism seat 39 support and determine the precise position and orientation of roof prism 12. Likewise, a set of four delta prism support pads 41 (FIG. 4) on a delta prism seat 42 and a pair of vertical delta prism stops 43 support and determine the position and orientation of delta prism 14. Both pairs of stops 40, 43 are shown in enlarged form for ease and clarity of presentation.

Figure 6:
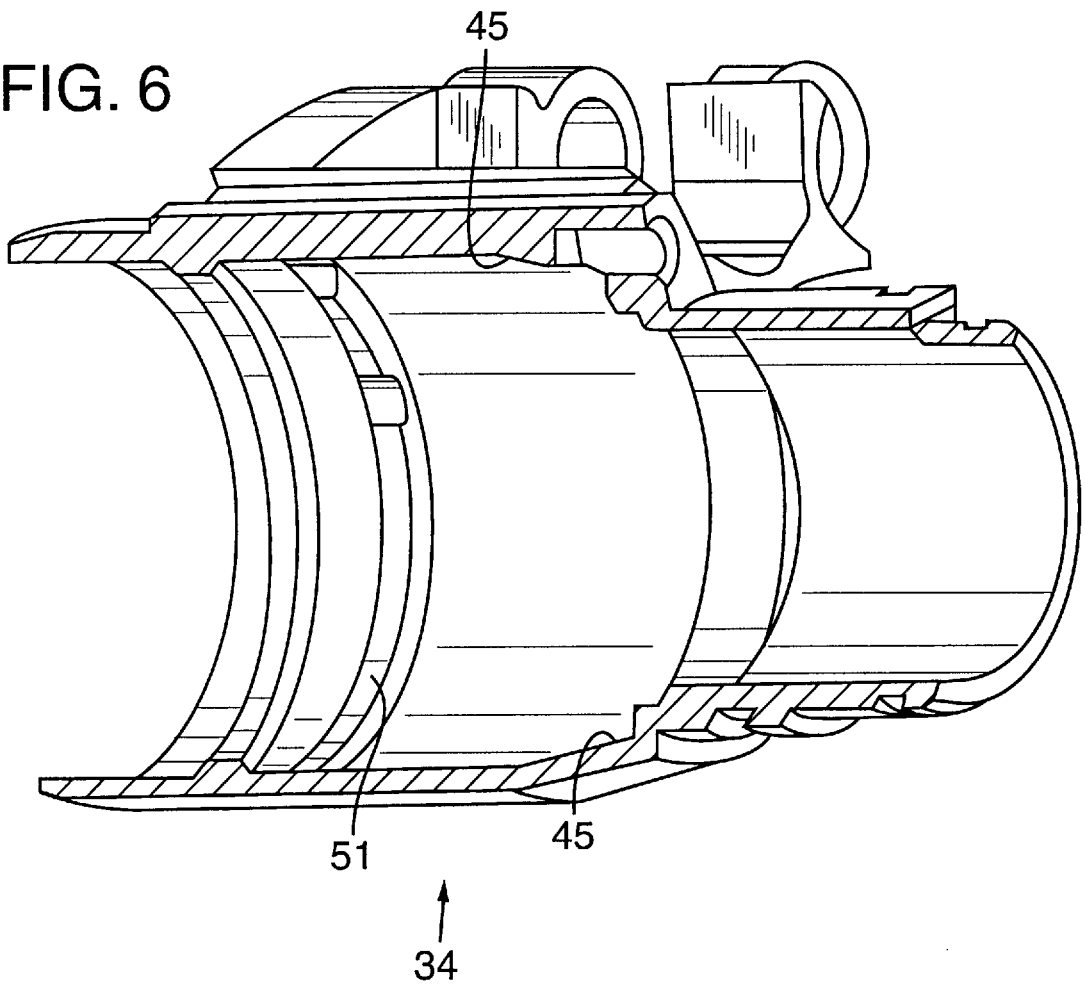
FIG. 6 is an enlarged cut-away view of the binocular body of FIG. 5.

At the proximal end 21 of prism set housing 20 is a tapering surface 44. FIG. 6 shows a cut-away view of binocular body 34. Surface 44 mates with a precisely machined matching surface 45 inside binocular body 34. In addition, pads 49, near the distal end 22 of prism set housing 20 mate with surface 51 in body 34. Structures 44, 45, 49 and 51 interact to ensure that housing 20 is aligned correctly about longitudinal axis 46 of channel 26. The rotational position of housing 20 is set by rotational positioner or slot 53, which mates with a key 53a (FIG. 5) on the interior of channel 26.

FIG. 5 as a whole illustrates the position of prisms 12 and 14 relative to binocular body 34, objective extension 32, and an eyepiece 47. A hinge 48 will link channel 26 to another channel (not shown) to form a completed pair of binoculars. A set of eccentric bearings (not shown) is available to mutually align the channels.

The present invention relates specifically to the seating of the prism set housing in a binocular channel. For this reason, and because it is well known in the art, the general construction of binoculars, including the various lenses used and the methods of focusing are not discussed here. The present invention could be used with virtually any binocular design.

Figure 7:
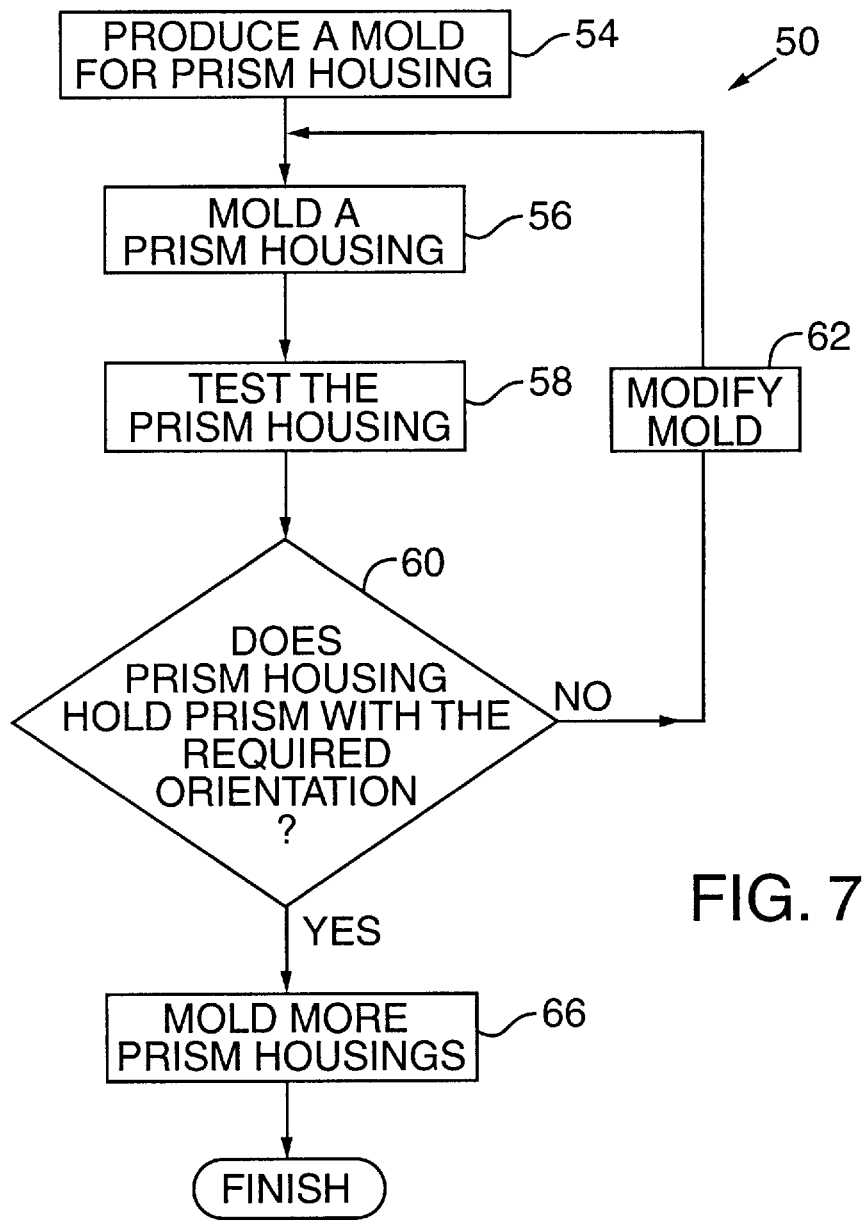
FIG. 7 is a flow chart outlining the steps of the method of the present invention.

FIG. 7 shows a flow graph 50 that outlines the steps of the method of the present invention.

The design for the binoculars and prism set housing 20 should be such that the orientation of the housing within the binocular channel is determined by the mating of precisely machined elements within channel 26 to precisely molded portions of the housing. For example, as noted earlier, FIG. 2 shows prism set tapering surface 44 that mates with complementary surface 45 in binocular channel 26 to ensure the correct axial orientation of the prism set housing 20.

A process block 54 represents that a mold should be made for a prism set housing. It is a physical principle of machining that it is easier to expand a mold cavity by further machining than to reduce its size by filling in areas that have already been machined. Therefore, so that the mold may be progressively modified, the cavity is deliberately made smaller in all of its critical points than it would otherwise need to be. Stated differently, the mold is designed so that sets of pads 41 and sets of 38, vertical stops 40, 43 will be slightly smaller than is ultimately necessary.

A process block 56 represents that prism set housing 20 is molded. During this process the temperature, pressure, and other characteristics of the molding process are set to standard levels and closely monitored. A process block 58 represents that candidate prism set housing 20 is tested for the ability to hold prism set 12 and 14 with the correct orientation. A number of different approaches may be taken here. First, a rough measurement may be taken with a coordinate measurement machine. This is a type of machine that can measure the dimensions of an object by extending a calibrated arm into contact with any point on the object whose position is to be measured.

For a more accurate determination, a single prism, either roof prism 12 or delta prism 14, is placed in prism set housing 20, which is itself positioned into a test fixture. Housing 20 is accurately oriented with respect to the test fixture by mating tapered surface 44 with a matching surface in the text fixture. Next, a light beam oriented parallel to the longitudinal axis of housing 20 is directed through the prism. Ideally, the beam will be bent by exactly 45 degrees due to its passage through the prism. Housing 20 and clips 23, 24 are designed so that the light may exit the housing. A target should be in place, centered along the ideal line of travel of the light beam. The error with which the light beam strikes the target is measured. The angular error of the light beam and the prism can be easily derived through simple trigonometry. This in turn yields, again through simple trigonometry, the relative error between roof prism support pads 38 and between roof prism stops 40 for roof prism test, or delta prism support pads 41 and delta prism stops 43 for delta prism test. This error may be corrected by selectively expanding the mold cavity to increase the height of the pad or pads among pads 38, 41 that are too short relative to the other pads 38, 41. Likewise, stops 40, 43 may be increased in size.

This method is not the only way to measure the error in prism orientation. Another method would be to use a theodolite to view a target through a prism held in a test-subject prism set housing.

A decision block 60 represents an inquiry whether the prism set housing 20 tested held prisms 12 and 14 at an orientation within the specified error limit. If not, criteria are developed, using well known optical principles, for modifying the prism set housing mold. Process block 62 represents that the mold is modified in accordance with modification criteria. Care must be taken, however, so that the machining is done conservatively so that the machinist may continue to selectively expand the mold cavity in the effort to reduce the error. When the answer to the inquiry represented by block 60 finally returns a "yes," the cycle of measurement and machining is stopped and, as represented by process block 66, a comparatively large number of prism set housings 20 are produced at the exact same temperature and pressure as the one that was within specification. These housings 20 may be used along with clips 23 and 24 in either the left or right binocular channel.

Superior results can be achieved by molding prism set housing 20 from a material which is extremely stiff in its finished state. The longer chain nylons, such as nylon-66, tend to be good materials for this purpose. Small bits or lengths of fiberglass may be mixed with the resin to add stiffness.

In general, the present invention has its greatest application with highly accurate, high magnification binoculars. Lower end products might not require the same degree of precision, accuracy, and clarity provided by the present invention. If the other tolerances of the binoculars are quite loose, it would not generally be necessary for the prisms to be positioned with such great accuracy.

It will be obvious to those having skill in the art that many changes may be made to the details of the above-described embodiment of this invention without departing from the underlying principles thereof. The scope of the present invention should, therefore, be determined only by the following claims.

We claim:

1. A method of manufacturing a quantity of optical devices, wherein each of said optical devices has an optical channel and wherein each said channel supports an optical train which includes a set of prisms held accurately in place by a housing having a shape, said method comprising:

selecting a set of prisms;

determining a specified orientation of the prisms, the specified orientation being bounded by an error tolerance;

fabricating a mold for injection molding a housing, said mold defining a mold cavity that substantially conforms to the shape of the housing;

injection molding a housing;

testing to determine whether the housing holds said prisms at an orientation that falls within the error tolerance of the specified orientation;

performing the following steps (i), (ii), and (iii) iteratively until the housing holds said prisms at an orientation that falls within the error tolerance of the specified orientation: (i) selectively expanding the mold cavity; (ii) molding a housing; and (iii) testing the housing to determine whether it holds said prisms at an orientation that falls within the error tolerance of the specified orientation;

molding a quantity of housings using said mold used in the last performance of step (ii); and installing said prisms and said housings in said optical channels during the assembly of said quantity of optical devices.

2. The method of claim 1 wherein a pair of said optical devices form binoculars, further comprising adjusting for each pair of binoculars the relative orientation of said optical channels of said pair of optical devices to compensate for alignment errors.

3. The method of claim 1 in which each said optical channel has a set of surfaces which mate with a set of complementary surfaces on said housing, thereby fixing the orientation of said housing.

4. The method of claim 1 in which each said optical channel is manufactured by precision machining.

5. The method of claim 1 in which each housing produced has a set of raised surfaces which define the orientation of each of said prisms.

6. The method of claim 1 in which the housing is molded from a resin composed of nylon mixed with particles of fiberglass.

7. The method of claim 1 in which the injection molding is carried out at a temperature and pressure, further comprising adjusting said temperature and pressure in response to the testing of the housing.

8. A method for producing a quantity of housings of a specified shape to a required accuracy for precisely supporting a set of prisms, comprising the following steps:

forming a shape specification for said housings, said shape specification bounded by an error tolerance;

forming a best estimate of a tooling specification for a mold for said housing;

constructing a mold, said mold defining a mold cavity that is selectively slightly smaller than specified by said tooling specification;

injection molding a test housing at a pressure and temperature setting;

testing the housing for dimensional accuracy;

performing the following steps (i) through (iii) iteratively until the error tolerance for the shape specification of the housing is met: (i) selectively expanding the mold cavity and adjusting the temperature and pressure setting as needed; (ii) injection molding a housing; and (iii) testing the housing to determine whether it conforms to the specified shape with the required accuracy; and injection molding a quantity of said housings using the temperature and pressure setting of the molding process and the mold used in the last iteration of step (ii).

9. The method of claim 8 in which each housing produced has a set of raised surfaces which define the orientation of each of said prisms.

10. The method of claim 8 in which the housing is molded from a resin composed of nylon mixed with particles of fiberglass.

11. The method of claim 8 in which the temperature and pressure at which the molding takes place is also adjusted in response to the testing of the housing.

* * * * *